United States Patent
Green Mullins

(10) Patent No.: US 11,198,027 B2
(45) Date of Patent: Dec. 14, 2021

(54) DECELERATOR PACKED TETHER AS AN INTERMEDIATE ARTICLE OF MANUFACTURE

(71) Applicant: Sherry Green Mullins, Jasper, GA (US)

(72) Inventor: Sherry Green Mullins, Jasper, GA (US)

( * ) Notice: Subject to any disclaimer, the term of this patent is extended or adjusted under 35 U.S.C. 154(b) by 342 days.

(21) Appl. No.: 16/244,734

(22) Filed: Jan. 10, 2019

(65) Prior Publication Data
US 2019/0217134 A1    Jul. 18, 2019

Related U.S. Application Data

(60) Provisional application No. 62/615,486, filed on Jan. 10, 2018.

(51) Int. Cl.
| | | |
|---|---|---|
| *A62B 35/04* | (2006.01) | |
| *F16F 7/00* | (2006.01) | |
| *A62B 35/00* | (2006.01) | |
| *A01M 31/02* | (2006.01) | |

(52) U.S. Cl.
CPC .............. *A62B 35/04* (2013.01); *A01M 31/02* (2013.01); *A62B 35/0075* (2013.01); *F16F 7/006* (2013.01)

(58) Field of Classification Search
CPC ... A62B 35/00; A62B 35/005; A62B 35/0043; A62B 35/04; A62B 35/0025; A62B 35/0068; A62B 35/0006; A62B 35/0075; A62B 35/0093; A62B 35/0056; F16F 7/003; F16F 7/006
See application file for complete search history.

(56) References Cited

U.S. PATENT DOCUMENTS

| | | | |
|---|---|---|---|
| 1,636,459 A | 7/1927 | Chappel | |
| 2,314,602 A | 3/1939 | Smith | |
| 2,475,631 A | 7/1949 | Miller et al. | |
| 2,519,352 A | 8/1950 | Caroll | |
| 3,277,543 A | 10/1966 | Gaylord | |
| 3,444,957 A * | 5/1969 | Ervin, Jr. ................. | F16F 7/00 182/3 |
| 3,448,826 A | 6/1969 | Rosenblum | |
| 3,757,893 A * | 9/1973 | Hobbs ................. | A62B 35/0025 182/6 |
| 3,804,698 A * | 4/1974 | Kinloch .................... | F16F 7/12 428/176 |
| 4,197,816 A | 4/1980 | Lusch | |
| 4,253,544 A * | 3/1981 | Dalmaso ................ | A62B 35/04 182/18 |
| 4,304,320 A * | 12/1981 | Hull ....................... | A62B 35/04 188/371 |
| 4,446,943 A | 5/1984 | Murray | |
| 4,446,944 A * | 5/1984 | Forrest .................... | A62B 35/04 182/3 |
| 4,687,074 A | 8/1987 | Green | |
| 4,991,689 A | 2/1991 | Cole | |

(Continued)

*Primary Examiner* — Alvin C Chin-Shue
*Assistant Examiner* — Shiref M Mekhaeil
(74) *Attorney, Agent, or Firm* — David L. King

(57) ABSTRACT

A Decelerator Packed Tether constructed with a Bungee Section and a Deployment Section in a combination of materials which, when combined as herein described, and a fall is experienced by the user, the maximum arrest force is one that will present the least amount of impact on the user conventional safety harnesses.

18 Claims, 12 Drawing Sheets

(56) References Cited

U.S. PATENT DOCUMENTS

| | | | |
|---|---|---|---|
| 5,004,136 A | 4/1991 | Leath | |
| 5,090,503 A * | 2/1992 | Bell | A62B 35/04 |
| | | | 182/5 |
| 5,113,981 A * | 5/1992 | Lantz | F16F 7/006 |
| | | | 182/3 |
| 5,136,724 A | 8/1992 | Grilliot et al. | |
| 5,141,074 A * | 8/1992 | Sulowski | A62B 35/0031 |
| | | | 182/133 |
| 5,174,410 A * | 12/1992 | Casebolt | A62B 35/04 |
| | | | 182/3 |
| 5,183,007 A | 2/1993 | Vincent | |
| 5,205,803 A * | 4/1993 | Zemitis | A63B 21/0552 |
| | | | 482/121 |
| 5,431,610 A * | 7/1995 | Miller | A63B 21/0004 |
| | | | 482/11 |
| 5,445,114 A * | 8/1995 | Walker | A63B 21/065 |
| | | | 119/857 |
| 6,035,966 A | 3/2000 | Lewis | |
| 6,128,782 A | 10/2000 | Young et al. | |
| 6,213,365 B1 | 4/2001 | Stocke et al. | |
| 6,223,854 B1 | 5/2001 | Nolz | |
| 6,299,040 B1 * | 10/2001 | Matias | A45F 5/00 |
| | | | 224/254 |
| 6,467,573 B1 * | 10/2002 | Parker | A62B 35/0075 |
| | | | 182/3 |
| 6,533,066 B1 * | 3/2003 | O'Dell | A62B 35/04 |
| | | | 182/3 |
| 6,776,317 B1 * | 8/2004 | Parker | A45F 5/00 |
| | | | 224/250 |
| 7,063,185 B2 * | 6/2006 | Green | A01M 31/02 |
| | | | 182/187 |
| 7,458,135 B2 * | 12/2008 | Mikesell | B25H 3/006 |
| | | | 24/300 |
| 7,794,374 B1 * | 9/2010 | Park | A63B 21/0552 |
| | | | 482/122 |
| 8,997,317 B2 * | 4/2015 | Rinklake | A62B 35/04 |
| | | | 24/300 |
| 9,630,081 B2 * | 4/2017 | Gillespie | A63B 21/0555 |
| 9,873,005 B1 * | 1/2018 | Williams | A45F 3/14 |
| 10,384,094 B1 * | 8/2019 | Newman | A63B 71/0054 |
| 10,716,390 B2 * | 7/2020 | Wagner | A45F 5/00 |
| 10,782,093 B2 * | 9/2020 | Dilling | F41C 33/002 |
| 10,844,922 B2 * | 11/2020 | Comet | F16F 7/08 |
| 2006/0027277 A1 * | 2/2006 | Jennings | D03D 11/00 |
| | | | 139/408 |
| 2006/0169534 A1 * | 8/2006 | Green | A62B 35/04 |
| | | | 182/7 |
| 2008/0060872 A1 * | 3/2008 | Wise | A62B 35/04 |
| | | | 182/3 |
| 2008/0164095 A1 * | 7/2008 | Snedeker | A62B 35/0006 |
| | | | 182/3 |
| 2008/0217371 A1 * | 9/2008 | Wemmer | F41C 33/00 |
| | | | 224/579 |
| 2011/0103558 A1 * | 5/2011 | Hooten | A62B 35/04 |
| | | | 379/37 |
| 2012/0067666 A1 * | 3/2012 | Smith | A62B 35/04 |
| | | | 182/3 |
| 2012/0267403 A1 * | 10/2012 | Ward, Jr. | A45F 5/00 |
| | | | 224/219 |
| 2012/0292129 A1 * | 11/2012 | Seman | A62B 35/04 |
| | | | 182/9 |
| 2014/0252051 A1 * | 9/2014 | Esch | F41C 33/002 |
| | | | 224/150 |
| 2018/0178047 A1 * | 6/2018 | Comet | A44B 18/0084 |
| 2019/0070445 A1 * | 3/2019 | Huseth | A62B 35/0025 |
| 2020/0030645 A1 * | 1/2020 | Bertoti | A62B 35/04 |

\* cited by examiner

DECELERATOR PACKED TETHER AS AN INTERMEDIATE ARTICLE OF MANUFACTURE

FIELD OF THE INVENTION

This invention relates to a decelerator packed tether for attachment to a safety harness, the safety harness can be used for securing a person to an anchor point.

BACKGROUND

In a typical hunting environment or in some work environments, safety harnesses must be utilized when the user is hunting or working from an elevated position. A conventional safety harness is secured about the user's body in a way to secure the user in the harness which is then attached to an anchor point on a Tree (in hunting) or a safety cage or other anchor point (in a work environment). The purpose of the safety harness is to prevent the user from hitting the ground. Without a safety harness, should the user fall from the elevated position, it could cause serious injury or death.

Conventional safety harnesses are comprised of a series of straps which are secured about the torso, shoulders, waist and legs. There are two leg straps. One strap is secured around the top of the legs, across the groin area (and femoral artery) and connect to other end of leg strap and/or back up to the waist strap. This series of straps has another strap of varying length (determined by the manufacturer) typically called a "tether". The "Tether" is attached to the safety harness at the back of the harness at a location at or about the area between the shoulder blades at center of the user's back and base of neck. It is typically attached either permanently or by use of a carabiner. The other end of the Tether typically has a carabiner which is used to connect to a fixed object at the elevated position capable of holding the user's body weight such as the tree (in hunting) or a safety cage or other anchor point in a work environment. The manufacturer determines the length of the tether based upon certification and testing criteria which typically have an established threshold for "maximum arrest force", among other testing criteria established by the governing body in the related industry. The "maximum arrest force" is the measure of force imposed on the user in the harness at the bottom of the drop or at peak impact force.

The arrest force is largely determined by the weight of the user in the harness and the length of the tether. The more the user weighs and the longer the tether is, the higher the "maximum arrest force" will measure. The higher the maximum arrest force is, the greater the risk is to the user as well as the liability to the manufacturer. To minimize the risk to the user, the tether can be shortened. But, the shorter the tether, the more uncomfortable and less functional the harness is.

For a user to be functional in the activity engaged in while wearing a safety harness, the tether must be long enough to give the user maneuverability. For that reason, most tethers have adjustable lengths with a lot of slack in them to accommodate the need for maneuverability. If the tether is adjustable, the user determines the length of the tether while in use. In the hunting scenario, if the user is hunting from an elevated position using a harness equipped with a tether with a lot of "slack", it causes the user to experience an unsettling discomfort when the user leans out to take a shot with a bow or gun as they wait for the tether to become taut. The same is true of users in industrial applications as well when the user must lean out to use a tool from an elevated position. Once the tether becomes taut, the user feels a comfort level from knowing they are being held securely by the tether at their elevated position.

The dilemma is in providing maneuverability for the user while minimizing the risk associated with a fall. Although a safety harness prevents a user from hitting the ground, it also can give the user a false sense of security they may not be aware of. And, though the user may not hit the ground, they certainly will "hit bottom" at the peak arrest force which, in most cases, would cause injury to the user, or put them at great risk or even in a lift threatening situation in many instances. One example of this is the user hunting alone in the woods for example where no one knows where the user is. Should that user experience a fall from their elevated platform, in a conventional harness equipped with a tether of varying length, that user will be in a life-threatening situation right away especially if he has no way of calling for help or identifying his/her location. If the user becomes unconscious or gets knocked out in the course of the fall, the user would be unable to call for help. It's truly a matter that needs to be addressed.

In conventional safety harness tethers, the methodology utilized to reduce arrest force is through the use of "Break Away Stitches" sewn in-line with the tether which "peel open" when force or weight is imposed by the weight of the user in the event of a fall from an elevated platform. The fallacy in this methodology is that the more break away stitches the manufacturer sews in-line in the tether, the longer the tether becomes. The longer the tether is, the higher the maximum arrest force is when all other variables remain constant.

From the manufacturer's standpoint: Manufacturers wish to provide an enjoyable experience in their harness and minimize their exposure from a liability stand point. So, they may provide an adjustable tether so the user can determine how much slack (length) they wish to have in their tether which can provide greater enjoyment for the user.

The manufacturer can provide proper instructions for users, inform users of the risks associated with using a safety harness and/or changing the length of the tether; and tell them how to minimize those risks. BUT, many users do not read instructions or heed warnings. Yet, in many cases, when an incident occurs, the manufacturer must bear the liability anyway.

So, they may not grasp the fact that the longer they make their tether, the greater their risk is using the product. Many users may believe that as long as they put a safety harness on, they're safe. But, that is simply not true.

Ultimately, there is a NEED for providing an enjoyable experience in a safety harness with the necessary maneuverability, sense of comfort and security while still minimizing the risk to the user associated with using the harness. Generally speaking, users don't want to become a specialist in safety harnesses. But, they do need to be safe if they properly utilize a safety harness. The Decelerator Packed Tether as an intermediate article of manufacture addresses the function of the tether in a safety harness system in way that it could be added to conventional harnesses and perform consistently.

Addressing the above described need, may also address the liability exposure for the manufacturer and insurance companies. And, it provides a harness that is truly safer for the user simply by giving the manufacturer a utility design that allows the manufacturer to minimize and control the maximum length of the tether, and creating somewhat of a "cushioned" drop likened unto a parachute drop in the event of a fall.

This invention was made to address that need provide a true sense of security; providing maneuverability while always feeling the comfort of the tether holding you and a safer fall with an arrest force as low as possible.

BRIEF DESCRIPTION OF DRAWINGS

The accompanying drawings, which are incorporated in and form a part of the specification, illustrate embodiments of the presently disclosed invention and, together with the description, disclose the principles of the invention.

DETAILED DESCRIPTION

Figure 1:
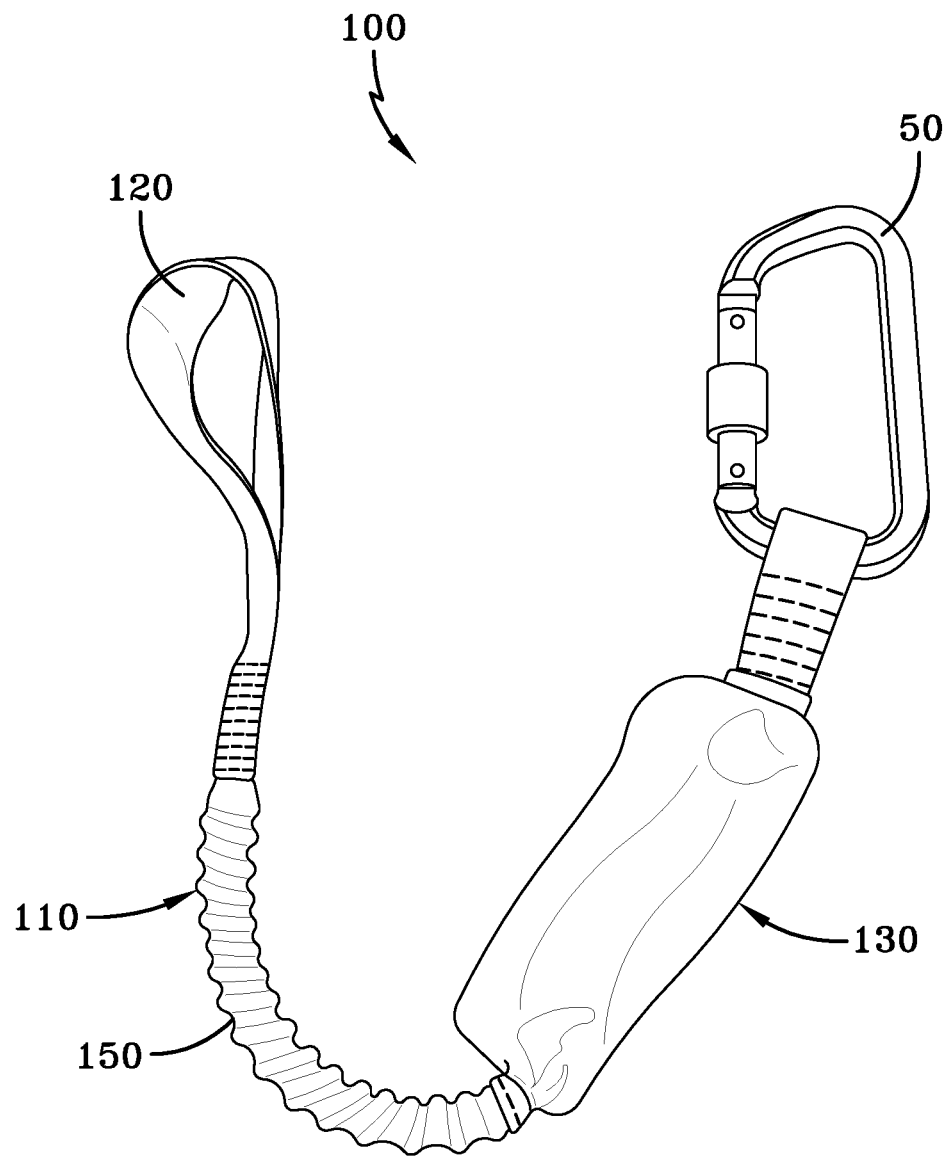
FIG. 1 is a perspective view showing decelerator packed tether of the present invention for attachment to a support harness for securing a person to an anchor point when hunting or working from an elevated position.

The Decelerator Packed Tether 100 addresses the function of the tether in a safety harness system in a way that it could be added to most conventional safety harnesses, as shown in FIG. 1. The Decelerator Packed Tether 100 is constructed of a special combination of materials which, when combined as herein described, provides greater comfort while in use; provides a greater sense of security while in use; and provides greater maneuverability while in use. More particularly, the Decelerator Packed Tether provides greater comfort in the event of a fall. The Decelerator Packed Tether is constructed of a combination of materials which, when combined as herein described, and a fall is experienced by the user, the maximum arrest force is one that will present the least amount of impact on the user of a conventional safety harnesses. The risks associated with injury potentially imposed on the user are much less than with conventional safety harnesses which do not utilize the decelerator packed tether of the present invention.

The Decelerator Packed Tether 100 is constructed of a combination of materials which, when combined as herein described, is constructed such that the deceleration system does not affect the length of the tether. In conventional safety harnesses, break away stiches are used in line with the tether to reduce the arrest force associated with a fall. The special configuration of the Decelerator Packed Tether maintains the deceleration system off line such that the length of the tether may be controlled by the manufacturer. In particular, the Decelerator Packed Tether of the present invention is constructed of a special combination of materials one of which is 1" or wider tubular webbing 150 with a very high breaking strength which can vary depending on the Maximum Arrest Force desired to achieve.

Figure 3:
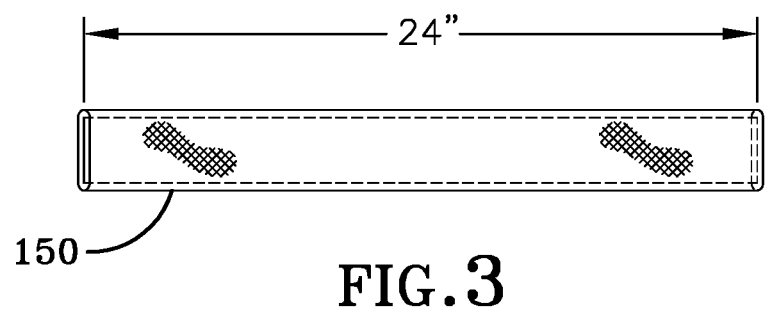
FIGS. 3 and 3A are perspective views of the tubular webbing of the decelerator packed tether.
Figure 3A:
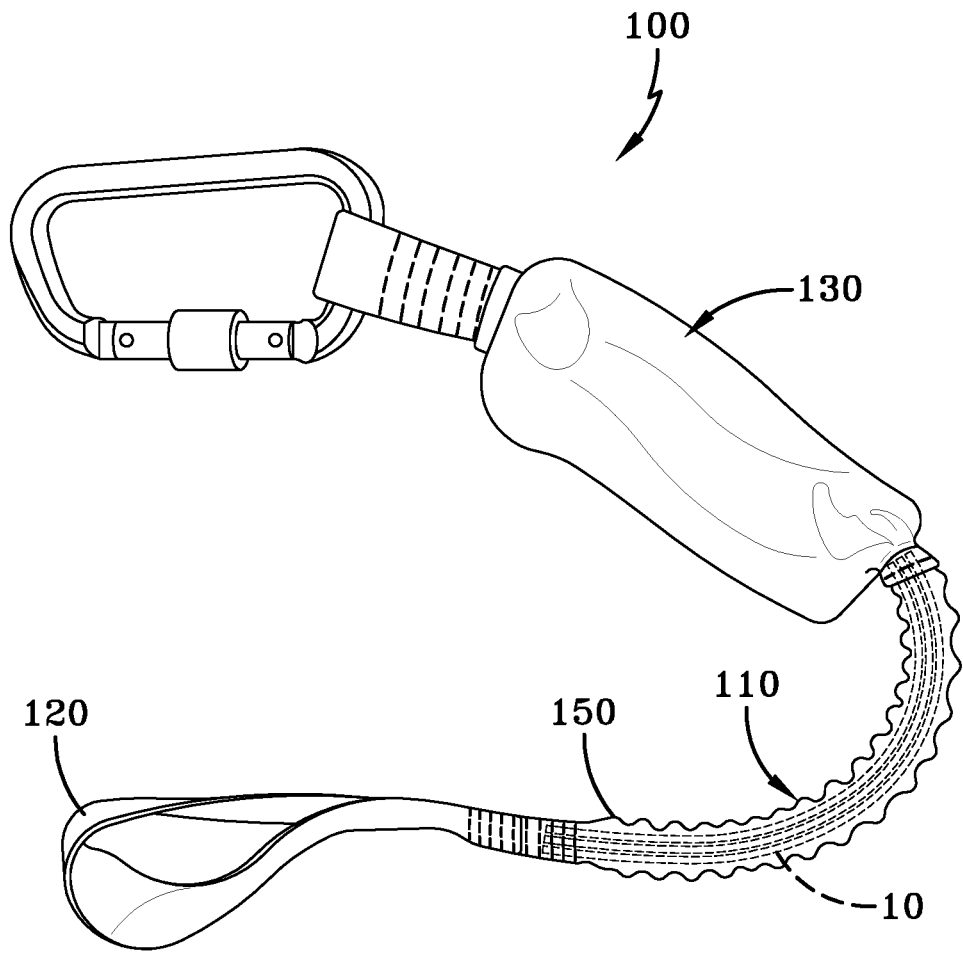

The Decelerator Packed Tether 100 is constructed of a special combination of materials one of which is at least 1" or wider tubular webbing 150 consisting of 2-cut lengths: one of which can be 18 or more inches, preferably 24" in cut length which is preferably cut with a heat knife to seal the ends to avoid fraying as shown in FIGS. 3 and 3A. This length will form a Bungee Section 110 which has elastic Bungee Cords 10 installed inside of it as described below.

Figure 4:
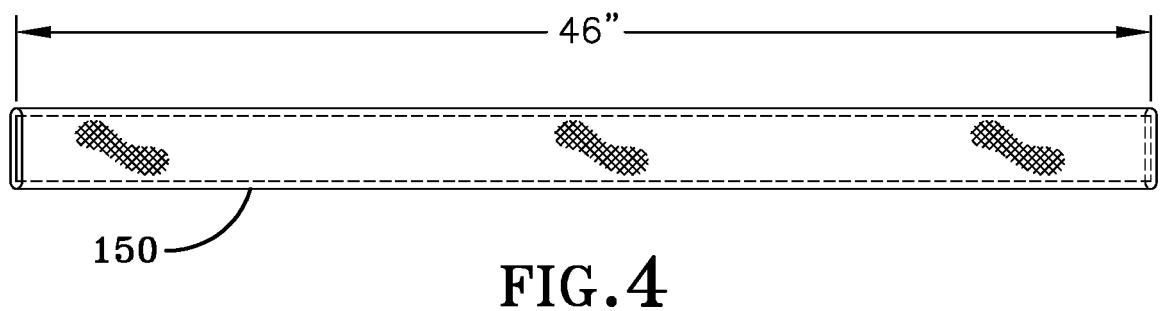
FIGS. 4 and 4A are another perspective view of the tubular webbing of the decelerator packed tether.
Figure 4A:
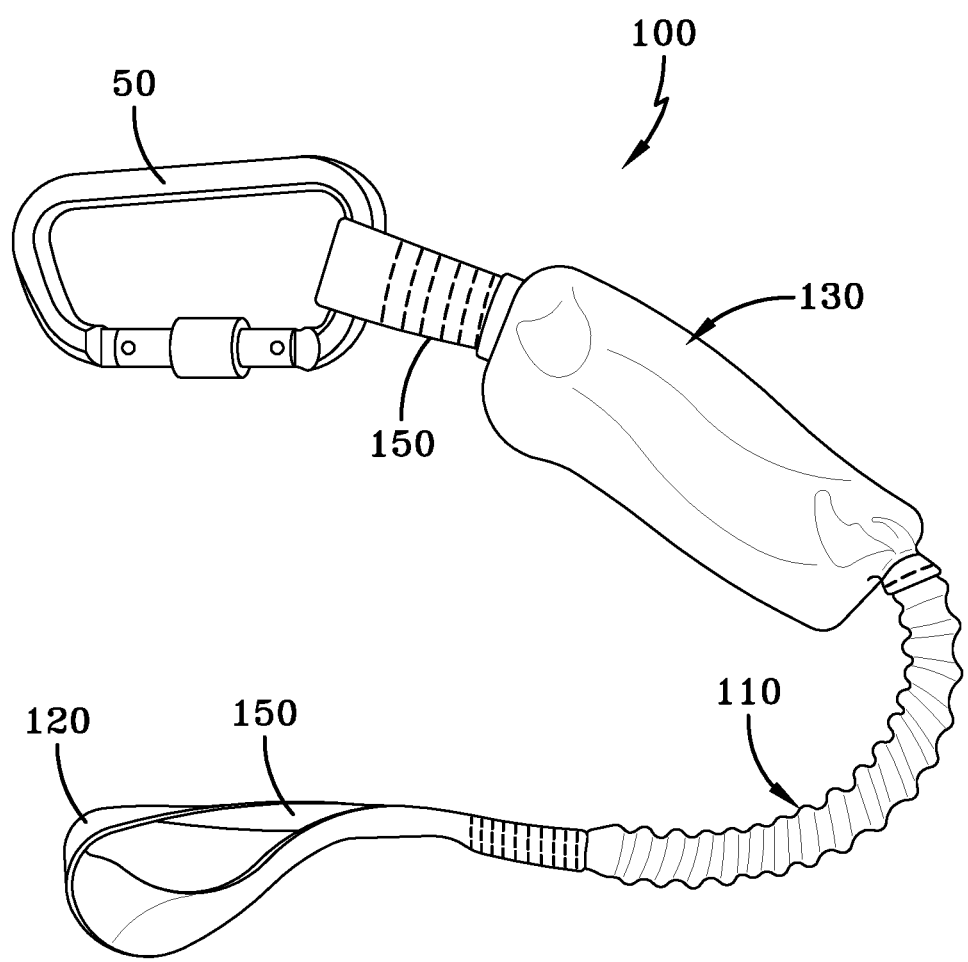

The Decelerator Packed Tether is further constructed of a special combination of materials, one of which can be 46" more or less in cut length which is cut with a heat knife to seal the ends to avoid fraying as shown in FIGS. 4 and 4A. This length will form a Deployment Section 130 of the Decelerator Packed Tether 100 as described below.

Figure 5:
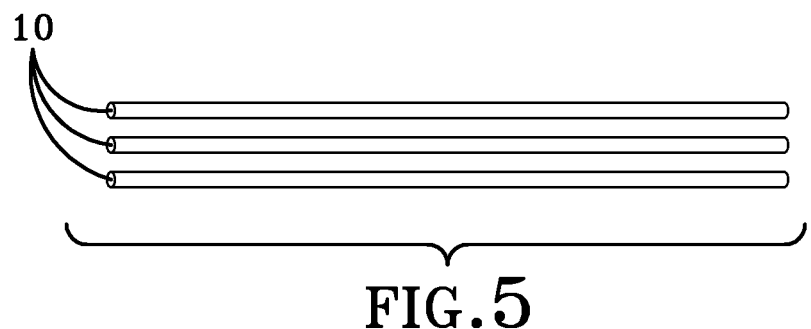
FIGS. 5 and 5A are perspective views of the bungee of the decelerator packed tether.
Figure 5A:
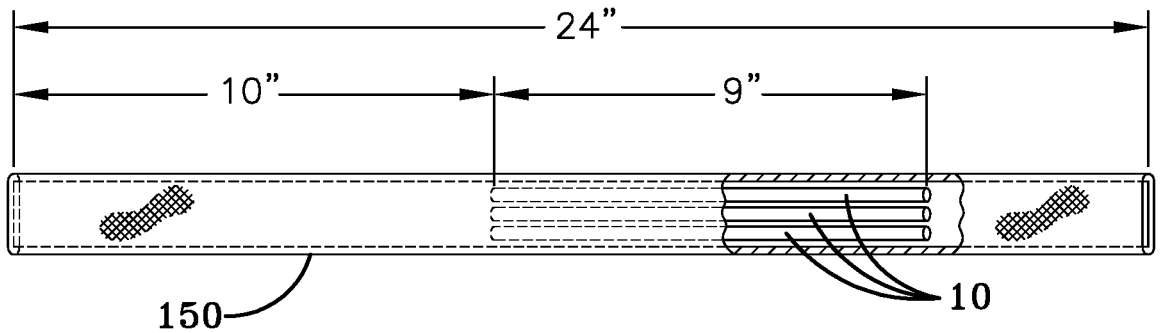
Figure 6:
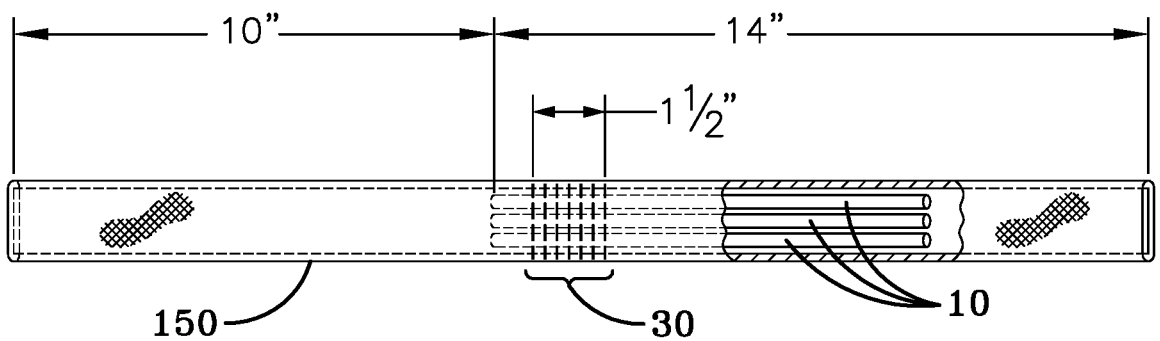
FIG. 6 is another perspective view of the bungee of the decelerator packed tether.

In the Bungee Section, 2 or more, preferably at least 3 elasticized, bungee cords 10 are cut with a length of about 9" more or less end to end in resting length and are inserted together inside the tubular webbing 150 with the end of the elasticized bungee cords being about 10" from the end of the tubular webbing 150 of the Bungee Section 110 as shown in FIGS. 5, 5A and 6.

Figure 7:
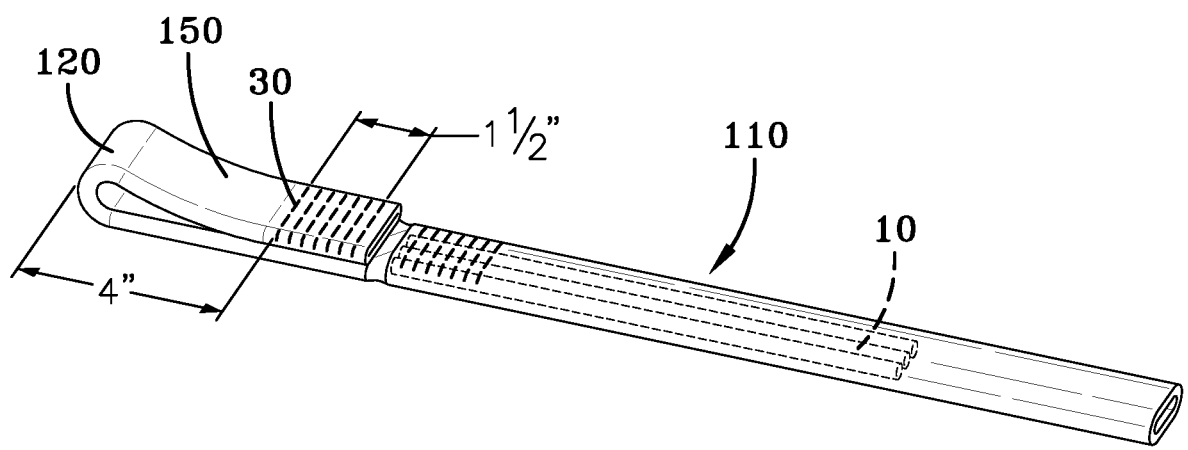
FIG. 7 is a perspective view of the bungee cords and the bar tacks that secure the end of the elasticized bungee cords of the decelerator packed tether.

In one embodiment, each of the ends of the 3 elasticized, bungee cords are secured inside the Tubular Webbing with the ends of all 3 elasticized bungee cords positioned 10" from the end of the Tubular webbing of the Bungee Section using a quantity of 7-1" bar tacks which are sewn across the width of the tubular webbing securing over a length of about 1.5" of the end of the 3 elasticized bungee cords while leaving a length of 7" more or less of the Elasticized Bungee Cords unsecured at this point inside the Tubular Webbing of the Bungee Section as shown in FIG. 7.

Figure 8:
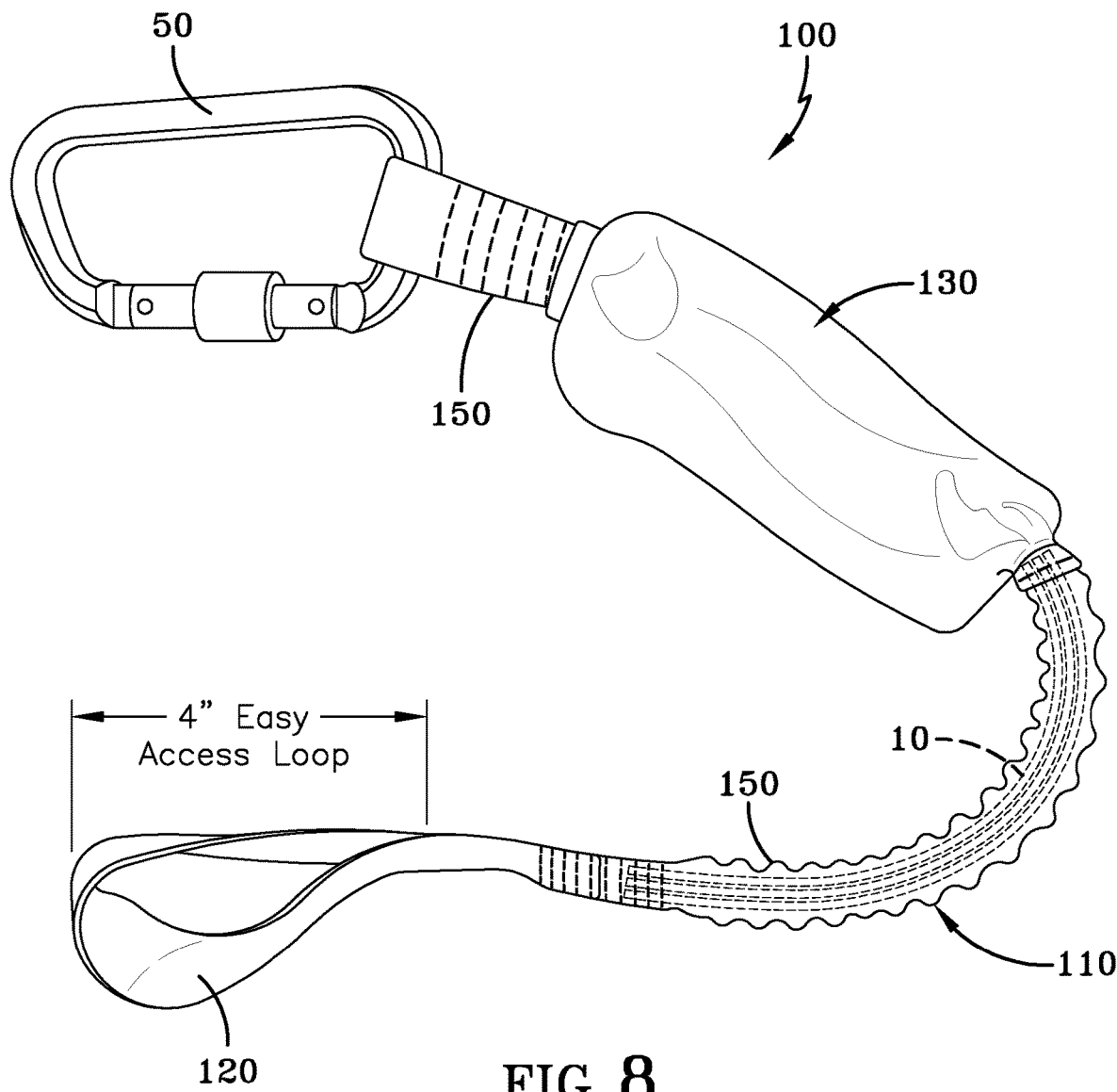
FIGS. 8 and 8A are views of the bar tacks that secure the end of the loop and the opening in the end of the tubular webbing.
Figure 8A:
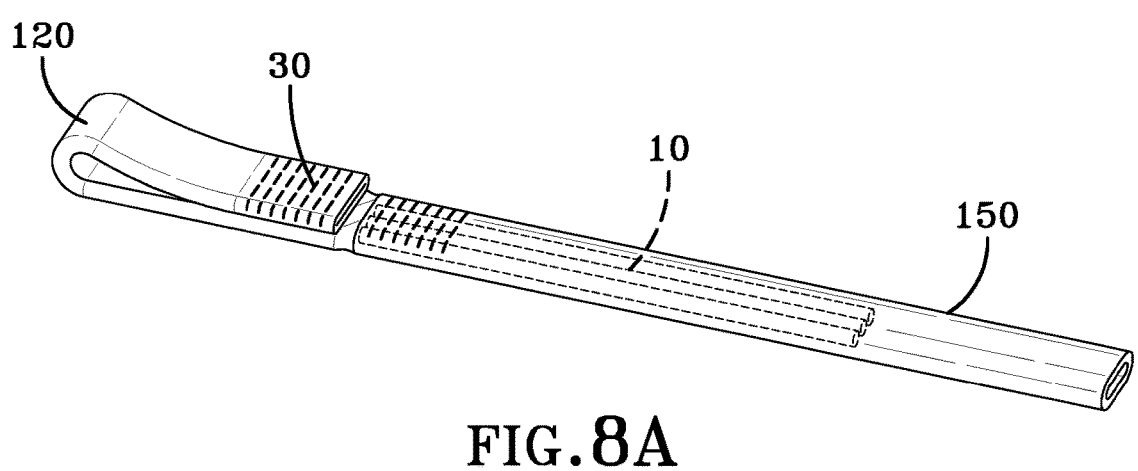
Figure 9:
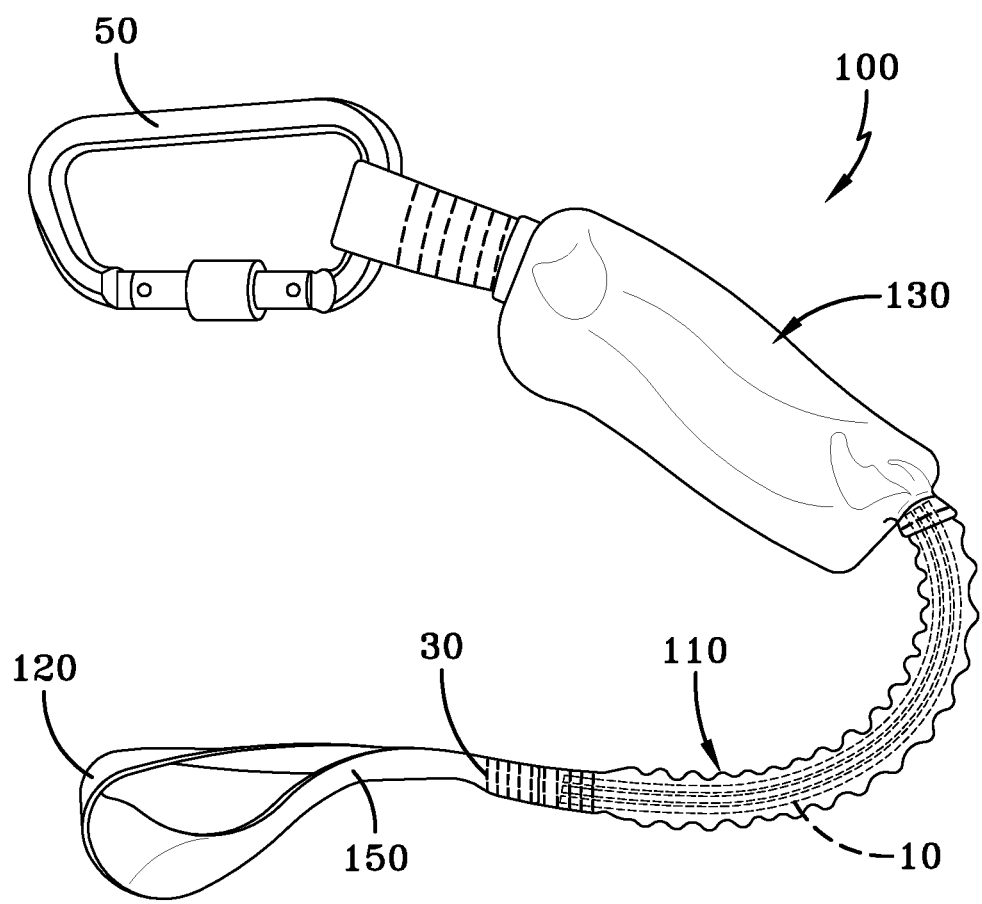
FIG. 9 is a view of the bar tacks to secure the end to for the easy access loop.

The one end of the Tubular webbing 150 is folded over extending to and adjacent the tubular webbing where the one end of each of the Bungees Cords are secured by the Bar Tacks 30 as shown in FIG. 8A. Once positioned, the one end of the tubular webbing is sewn to the tubular webbing forming a loop 120 end of the Tubular Webbing. Once repositioned, the loop end of the Tubular Webbing is secured with a quantity of 7-1" Bar Tacks sewn across the width of the Tubular Webbing adjacent the end of the Bungee Cords secured by the Bar Tacks.

An Easily accessed 4" Loop 120 is formed at the end of the Tubular Webbing using the 7-1" Bar Tacks. The loop 120 is formed in a manner that makes the loop 120 stay open and easily accessed with one hand.

Gathering up the Tubular Webbing with the Bungees, a length of about 1.5" of the one end of the three elasticized bungee cords extends from the seven 1 inch bar tacks inside the tubular webbing and the loop end is sewn to the tubular webbing overlying the one ends of the three elasticized bungee cords. There will be 1.5" of Tubular Webbing remaining with the end open.

Figure 10:
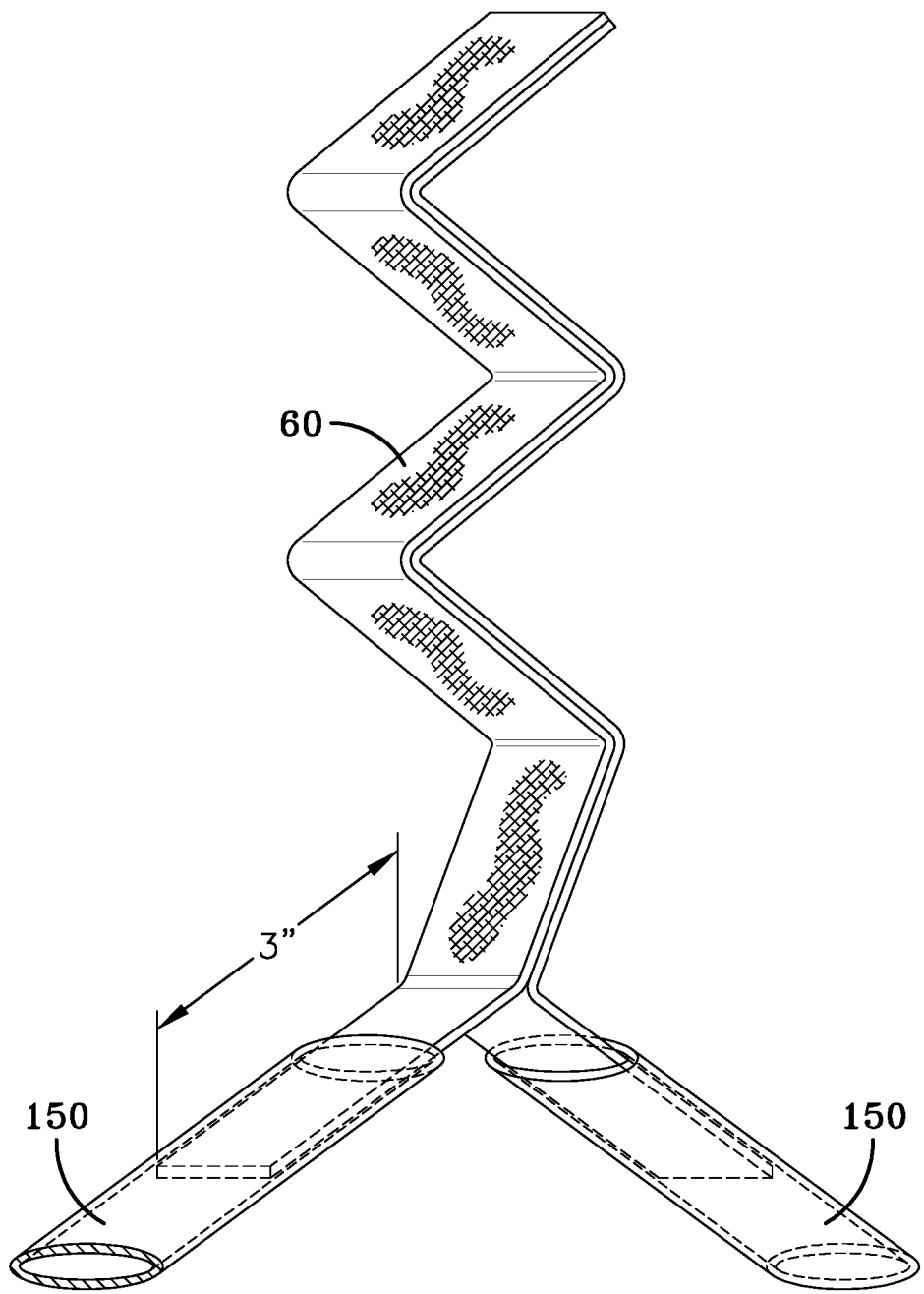
FIG. 10 shows the end of the decelerator material, tubular webbing, and loose end of decelerator material.

The Decelerator Packed Tether 100 is constructed with the above defined Bungee Section 110 and the Deployment Section 130 in a combination of materials which, when combined as herein described, and a fall is experienced by the user, the maximum arrest force is one that will present the least amount of impact on the user conventional safety harnesses. With regard to the Deployment Section 130, one of the combination of materials of which is a deceleration material 60 made of two layers of material of a length of approximately 18" long. 15" of the 18" length of deceleration material is woven together to a split where the weaving stops and the two layers of material split apart forming two ends which are about 3" long, illustrated in FIG. 10.

Figure 11:
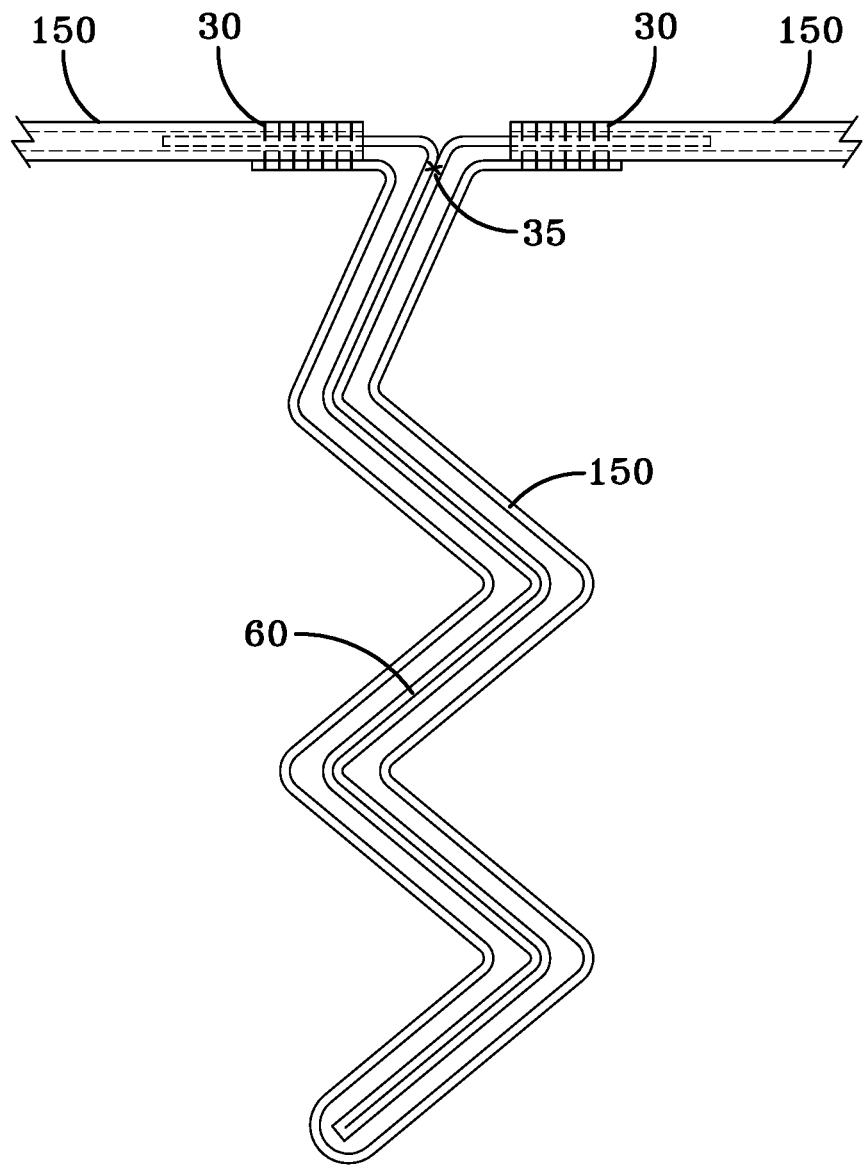
FIG. 11 shows the decelerator material inside woven together, two ends of decelerator material secured inside the tubular webbing and the tubular webbing with end of decelerator material sewn inside with bar tacks.
Figure 12:
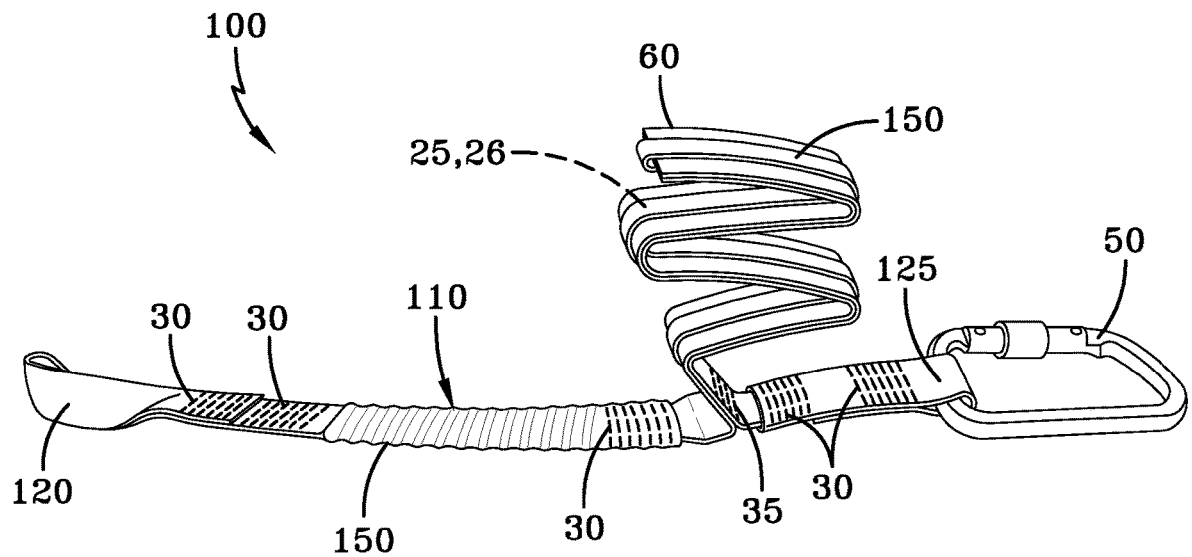
FIGS. 12 and 12A show the decelerator system held offline by the 700 #deployment stitch.
Figure 13:
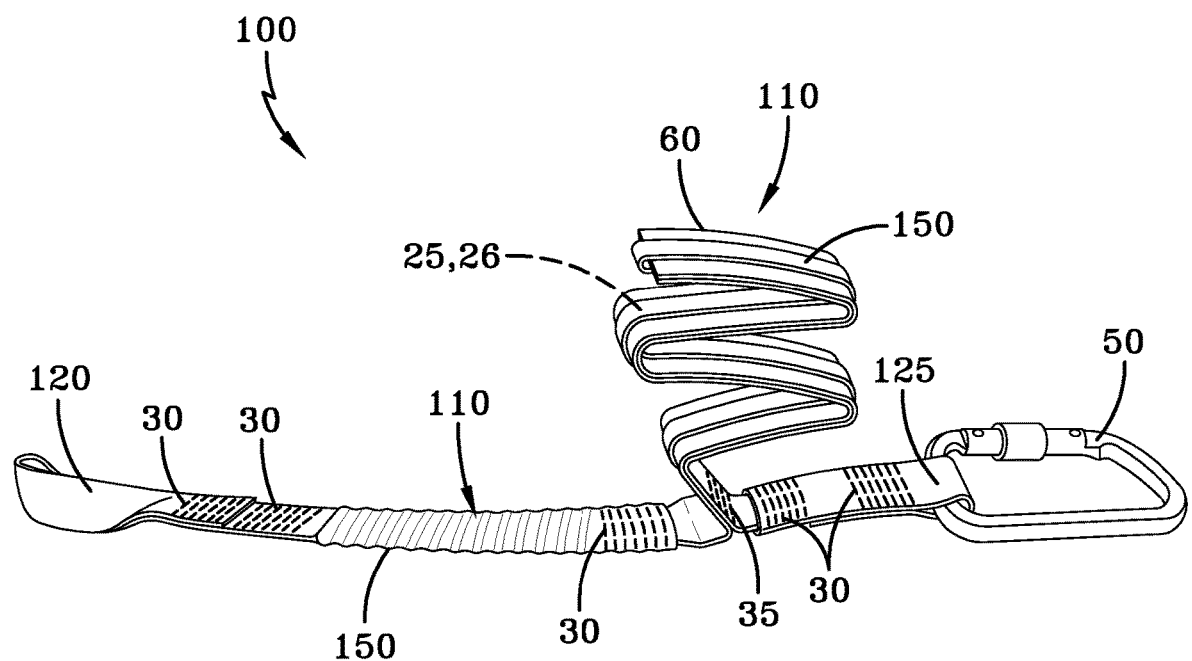
FIG. 13 shows another view of the decelerator system.

The following method of manufacturing the Deployment Section 130 is now described. The Deceleration Material 60 has 1.5" of each one of the two ends of the 3" long ends inserted into an open end of the Tubular Webbing 150 until it butts up against the end of the Elasticized Bungees 10 or bar tacks 30 leaving 1.5" of the deceleration material exposed. Each of the two ends of the Deceleration Material 60 is secured using a quantity of 7-1" bar tacks 30 which are sewn across the width of the tubular webbing 150 for a length of about 1.5" across the ends of the 3 elasticized bungee cords, illustrated in FIG. 11. A length of the tubular webbing at one end opposite the loop end for easy access has 8" of the end folded over and sewn with a quantity of 7-1" bar tacks 30 across the width of the tubular webbing 150 forming a small loop 125 approximately 1" configured so a carabiner 50 can pass through as shown in FIGS. 12 and 13. Using the Deceleration Material, 1.5" of the other end of the remaining 3" long end is inserted up into the open end of the Tubular Webbing until it butts up against the Bar Tacks. The Tubular Webbing is now forming a loop around the Deceleration material whereby the Bungee Section of the Decelerator Packed Tether secures one end of the Deceleration Material and loop end of the Tubular Webbing secures the other end of the deceleration material. Now, the Deceleration Material must be secured off line so that the Tether length is the distance from the small loop end to the Easily Accessed 4" Loop end on the Bungee Section. Laying the Deceleration Material flat down, sew a 1" long Deployment Stitch 35 extending across each of the two ends of the Deceleration Material 60. Each deployment Stitch pattern should have the breaking strength desired to break and to deploy the deceleration Material in the event of a fall.

When the Deceleration Packed Tether is used on a conventional safety harness. The breaking strength of the stitch pattern 35 for a hunting scenario may be approximately 700 pounds. The tether length is effectively now 20" long plus the length of a carabiner used to attach the tether to an anchor point. The deceleration Material secured one end in the Tubular Webbing and one in the tubular webbing.

The assembled Deceleration Material 60 inside the folded Tubular Webbing 150 and secured off line by the Deployment Stitch 35 can now be folded neatly up together and contained inside a nylon fabric forming a Decelerator Pack around it. The Deployment Stitch can be utilized to deploy any number of tools off line for use of the person utilizing the harness equipped with the Decelerator Packed Tether. The Deployment Stitch is unique as it allows the tether length to be controlled by the manufacturer of the harness. By being able to control the length of the tether with the Deployment Stitch of, the manufacturer can more easily control the Maximum Arrest Force. By utilizing the Decelerator Packed Tether, the Deployment Stitch can be used to deploy one or a combination of tools useful for a hunter or worker.

Figure 12A:
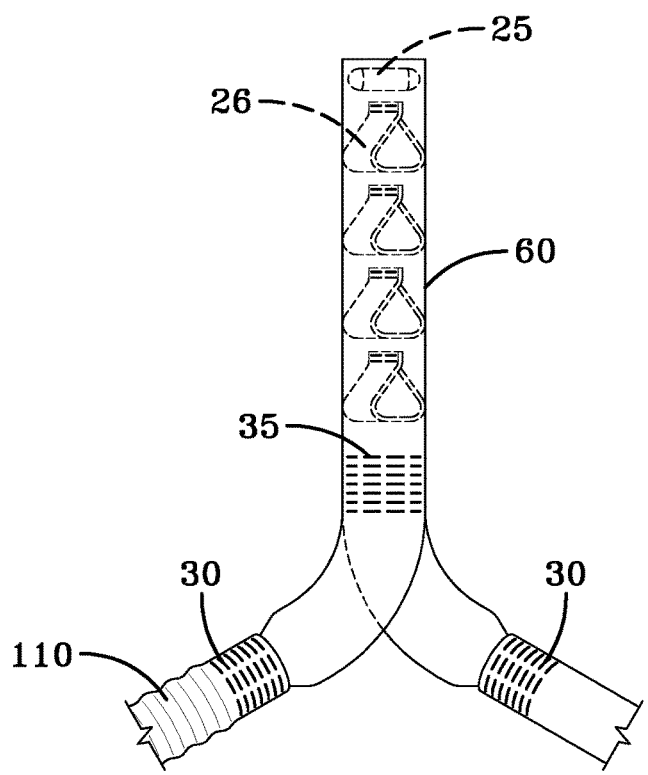

As shown in FIGS. 12, 12A and 13, the Decelerator Packed Tether 100 may have a GPS locator 25 which is deployed when the Deployment Stitch 35 Breaks. A GPS Locator utilized with the Decelerator Packed Tether can be configured with the user's personal information such as name, age, address, phone number, emergency contact information, medical conditions, and of course, GPS location. The GPS Locator utilized in the Decelerator Packed Tether can send a signal to emergency medical personnel such as paramedics, fire station, emergency contact, etc. complete with the user's GPS location.

The Decelerator Packed Tether 100 may also deploy a fall escape ladder 26. The Fall Escape Ladder 26 may be made of Tubular Webbing 150, illustrated in FIGS. 12, 12A and 13. The Fall Escape Ladder may be configured by sewing the Tubular Webbing in such a fashion to form triangular steps and provide a way for the user to climb back up to the elevated position and self-extract removing the user from a life-threatening situation. The Fall Escape Ladder is lightweight and may be contained in a nylon pouch to minimize the space required to transport it on the Decelerator Packed Tether.

The Decelerator Packed Tether 100 is made up of a unique combination of materials which are assembled in a unique fashion which yields a tether system that may be used on any conventional safety harness and yield an effect likened unto an unexpected parachute drop in the event of a fall. The Tether System yields the lowest maximum arrest force possible in the event of a fall in any harness equipped with the Tether System.

The Tether System of the Invention Described may be modified to further control the effects of a fall in a safety harness equipped with the Tether System simply by changing the length of the decelerator material.

Figure 2:
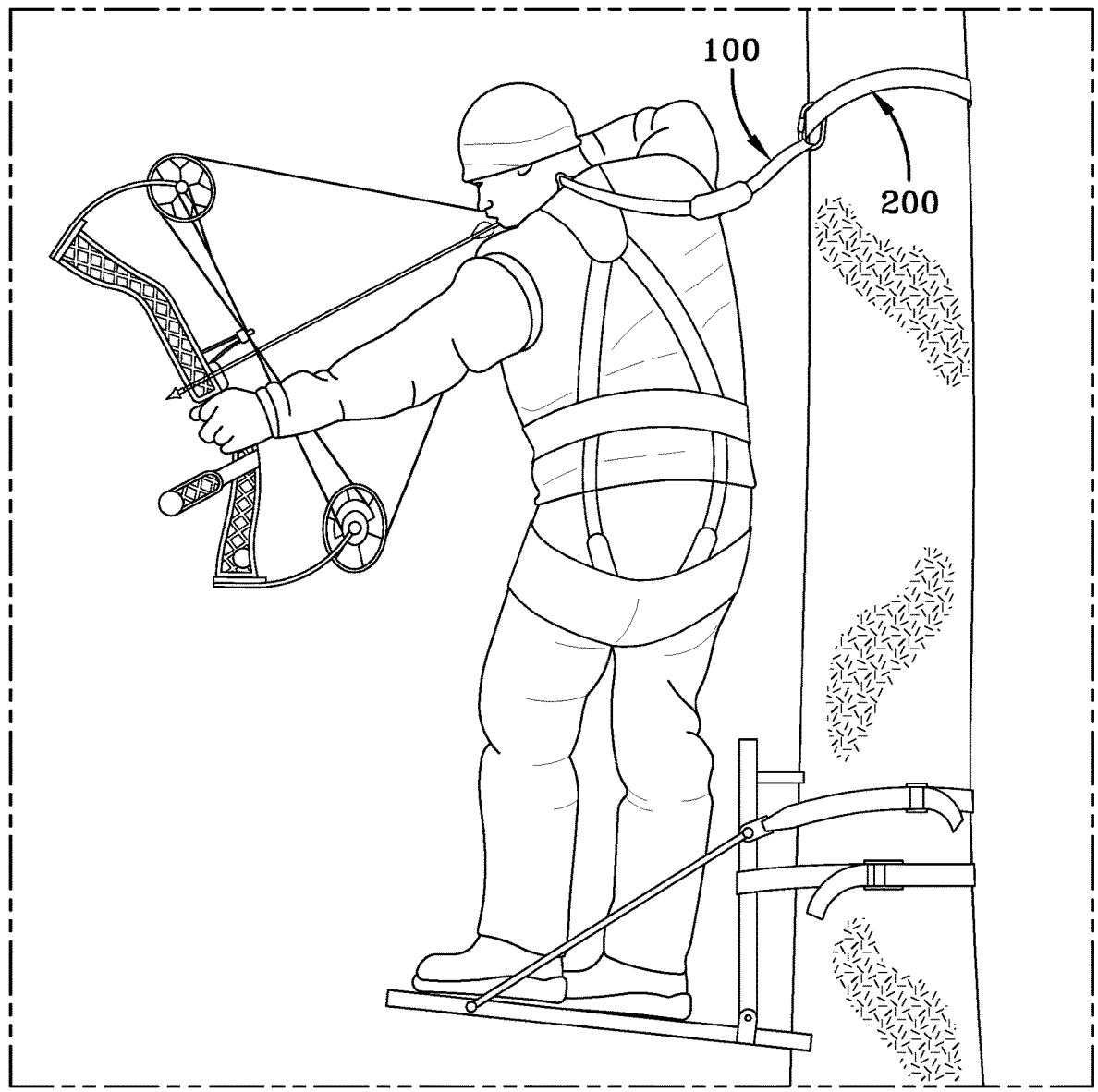
FIG. 2 is a perspective view attached to a support harness securing a person to an anchor point when hunting.

The Tether System may be modified to further control the effects of a fall in a safety harness equipped with the Tether System simply by changing the length of the effective length of the tether. The Tether System may be modified to further control the effects of a fall in a safety harness equipped with the Tether System simply by changing the length of the Elasticized Bungees. The Tether System may be modified to further control the effects of a fall in a safety harness equipped with the Tether System simply by changing the length of the decelerator material. The Tether System may be attached to an anchor point 200 made up of a length of webbing secured around the tree or other structure as shown in FIG. 2.

The Anchor point 200 may have a secondary layer of material or webbing may be sewn on the back side of the Anchor Point closest to the Tree or other structure. No stress would be placed therefore on the stitch patterns holding the secondary layer onto the anchor point. The Secondary layer of webbing material allows the Tether to glide along the Anchor Point which provides greater mobility for the user. The anchor point allows the Tether to glide along the Anchor Point which will not increase the maximum arrest force in the event of a fall.

What is claimed is:

1. A decelerator packed tether comprises:
 a bungee section; and a deployment section;
 wherein the bungee section has a tubular webbing with a plurality of bungee ends inserted into the tubular webbing, wherein the tubular webbing has a width of at least 1 inch, the tubular webbing is cut into a length of at least 18 inches or more extending between two opposite ends of the cut length and three elasticized bungee cords inserted into the tubular webbing and the three elasticized bungee cords each have a length of about 9 inches, wherein the three elasticized bungee cords each have a pair of ends of said plurality of bungee ends, one end of each bungee cord being positioned about 10 inches from one end of the tubular webbing of the bungee section and sewn to the tubular webbing by a plurality of bar tacks sewn across the width of the tubular webbing.

2. The decelerator packed tether of claim 1 wherein the plurality of bar tacks are seven 1 inch bar tacks sewn across the width of the tubular webbing securing over a length of about 1.5 inches from the one end of the three elasticized bungee cords leaving a length of about 7 inches of each bungee cord of the three elasticized bungee cords unsecured inside the tubular webbing.

3. The decelerator packed tether of claim 2 wherein the one end of the tubular webbing is folded over the one end of each of the three elasticized bungee cords which are secured by the bar tacks, and the one end of the tubular webbing being folded over and sewn to the tubular webbing forming a loop end of the tubular webbing.

4. The decelerator packed tether of claim 3 wherein, the loop end of the tubular webbing is secured with a quantity of 7-1" bar tacks sewn across the width of the tubular webbing adjacent the end of the three elasticized bungee cords sewn to the plurality of bar tacks.

5. The decelerator packed tether of claim 4 wherein the loop end forms a 4" loop at the end of the tubular webbing; and the loop including a through opening.

6. The decelerator packed tether of claim 5 wherein for a length of about 1.5" of the one end of the three elasticized bungee cords extends from the seven 1 inch bar tacks inside the tubular webbing and the loop end is sewn to the tubular webbing overlying the one ends of the three elasticized bungee cords.

7. The decelerator packed tether of claim 6 wherein the deployment section comprises a deceleration material made of two layers of material of which is a length of approximately 18" 15" of the 18" length of deceleration material being woven together to a split where, the weaving stops and the two layers of material split apart forming two ends which are about 3" long.

8. The decelerator packed tether of claim 7 wherein the deceleration material has each one of the two ends of the 3" long ends inserted into an open end of the tubular webbing until the end butts against the end of the elasticized bungees or bar tacks leaving 1.5" of the end of the deceleration material exposed.

9. The decelerator packed tether of claim 8 wherein each of the two ends of the deceleration material is secured using a quantity of 7-1" bar tacks which are sewn across the width of the tubular webbing for the length of about 1.5" across the ends of the three elasticized bungee cords.

10. The decelerator packed tether of claim 9 wherein the length of the tubular webbing at one end opposite the loop end for easy access is folded over and sewn with a quantity of 7-1" bar tacks across the width of the tubular webbing forming a loop approximately 1" configured so a carabiner can pass through.

11. The decelerator packed tether of claim 10 wherein 1.5" of an other end of the remaining 3" end is inserted into an open end of the two ends of the tubular webbing until it butts up against the bar tacks, the tubular webbing forming the loop around the deceleration material whereby the bungee section of the decelerator packed tether secures the one end of the deceleration material and the loop end of the tubular webbing secures the other end of the deceleration material.

12. The decelerator packed tether of claim 11 wherein the tether length is the distance from the small loop end to the accessed 4" loop end on the bungee section.

13. The decelerator packed tether of claim 12 wherein the deceleration material has a 1" long deployment stitch extending across each of the two ends of the deceleration material, wherein each deployment stitch has a breaking strength configured to break and to deploy the deceleration material in the event of a fall.

14. The decelerator packed tether of claim 13 wherein when the decelerator packed tether is used on a safety harness, the breaking strength of the stitch pattern for a hunting scenario is approximately 700 pounds.

15. The decelerator packed tether of claim 14 wherein the tether length is 20" long plus the length of a carabiner used to attach the tether to an anchor point, the deceleration material secured one end in the tubular webbing with the loop end for access and one in the tubular webbing with the loop for the carabiner.

16. The decelerator packed tether of claim 15 wherein the deceleration material and the tubular webbing are folded together and contained inside a nylon fabric pouch.

17. The decelerator packed tether of claim 16 wherein the deployment stitch can be utilized to deploy a plurality of tools off line for use of the person utilizing the harness equipped with the decelerator packed tether, including a GPS locator which is deployed when the deployment stitch breaks.

18. The decelerator packed tether of claim 17 wherein the decelerator packed tether has a fall escape ladder, the fall escape ladder being made of the tubular webbing.

* * * * *